(12) United States Patent
Raghavan et al.

(10) Patent No.: US 12,119,949 B2
(45) Date of Patent: *Oct. 15, 2024

(54) SYSTEMS AND METHODS FOR PROVIDING A COLLABORATION WORK MANAGEMENT PLATFORM THAT FACILITATES DIFFERENTIATION BETWEEN USERS IN AN OVERARCHING GROUP AND ONE OR MORE SUBSETS OF INDIVIDUAL USERS

(71) Applicant: Asana, Inc., San Francisco, CA (US)

(72) Inventors: Srikrishna Raghavan, San Francisco, CA (US); Lawrence Han, San Francisco, CA (US)

(73) Assignee: Asana, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/474,515

(22) Filed: Sep. 26, 2023

(65) Prior Publication Data
US 2024/0031188 A1   Jan. 25, 2024

Related U.S. Application Data

(63) Continuation of application No. 18/173,403, filed on Feb. 23, 2023, now Pat. No. 11,831,457, which is a
(Continued)

(51) Int. Cl.
*H04L 12/18* (2006.01)
*G06F 21/62* (2013.01)
(Continued)

(52) U.S. Cl.
CPC ............ *H04L 12/185* (2013.01); *G06F 21/62* (2013.01); *G06Q 10/06* (2013.01); *G06Q 10/10* (2013.01);
(Continued)

(58) Field of Classification Search
None
See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.
(Continued)

*Primary Examiner* — Lashonda Jacobs-Burton
(74) *Attorney, Agent, or Firm* — Esplin & Associates, PC

(57) ABSTRACT

Systems and methods for providing a collaboration work management platform that facilitates differentiation between users in an overarching group and one or more subsets of individual users within the overarching group to enable the users within the individual subsets to use the collaboration work management platform differently users within the other subsets, the method being implemented by a computer system including one or more physical processors configured by machine-readable instructions are disclosed. Exemplary implementations may: manage environment state information for maintaining a collaboration environment.

20 Claims, 4 Drawing Sheets

Related U.S. Application Data continuation of application No. 17/587,386, filed on Jan. 28, 2022, now Pat. No. 11,632,260, which is a continuation of application No. 16/915,350, filed on Jun. 29, 2020, now Pat. No. 11,290,296, which is a continuation of application No. 16/003,460, filed on Jun. 8, 2018, now Pat. No. 10,785,046.

(51) Int. Cl.
  *G06Q 10/06* (2023.01)
  *G06Q 10/10* (2023.01)
  *H04L 51/04* (2022.01)
  *H04L 67/02* (2022.01)

(52) U.S. Cl.
  CPC ....... *G06Q 10/103* (2013.01); *H04L 12/1822* (2013.01); *H04L 51/04* (2013.01); *H04L 67/02* (2013.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A * | 11/1999 | Heile .................. G06F 11/2294 709/215 |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 * | 9/2014 | Frields .................. G06Q 10/101 715/756 |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,268,875 B2 | 2/2016 | Campbell |
| 9,350,560 B2 * | 5/2016 | Hupfer ................ H04L 65/4015 |
| 9,367,117 B2 | 6/2016 | Timm |
| 9,383,917 B2 | 7/2016 | Mouton |
| 9,405,532 B1 | 8/2016 | Sullivan |
| 9,405,810 B2 | 8/2016 | Smith |
| 9,454,623 B1 * | 9/2016 | Kaptsan ................. G06F 30/13 |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,935,934 B1 | 4/2018 | Orozco |
| 9,949,681 B2 | 4/2018 | Badenes |
| 9,953,282 B2 | 4/2018 | Shaouy |
| 9,959,420 B2 * | 5/2018 | Kiang .................. G06F 21/552 |
| 9,978,040 B2 * | 5/2018 | Lee ...................... G06Q 10/103 |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,007,406 B1 | 6/2018 | Libin |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 * | 8/2019 | Holm ...................... G06Q 50/01 |
| 10,382,501 B2 * | 8/2019 | Malatesha ........... H04L 65/1089 |
| 10,455,011 B2 | 10/2019 | Kendall |
| 10,496,943 B2 | 12/2019 | De |
| 10,594,788 B2 * | 3/2020 | Larabie-Belanger ........................ H04L 65/403 |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,327,645 B2 | 5/2022 | Karpe |
| 11,341,444 B2 | 5/2022 | Sabo |
| 11,341,445 B1 | 5/2022 | Cheng |
| 11,449,836 B1 * | 9/2022 | Clifton ................. G06Q 10/105 |
| 2002/0065798 A1 * | 5/2002 | Bostleman ............ G06Q 10/10 |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |

(56) References Cited

U.S. PATENT DOCUMENTS

| | | |
|---|---|---|
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1* | 11/2007 | Mahoney ............... G06F 16/907 |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0205616 A1 | 8/2008 | Teng |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0137235 A1 | 5/2012 | T S |
| 2012/0158946 A1 | 6/2012 | Shafiee |
| 2012/0192086 A1* | 7/2012 | Ghods ............... G06Q 10/10 715/753 |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1* | 6/2013 | Ranade ............... A63F 13/00 709/204 |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |

(56) References Cited

U.S. PATENT DOCUMENTS

| | | | |
|---|---|---|---|
| 2013/0227007 A1* | 8/2013 | Savage | G06Q 10/101 709/204 |
| 2013/0246110 A1 | 9/2013 | Nakhayi Ashtiani | |
| 2013/0246399 A1 | 9/2013 | Schneider | |
| 2013/0275229 A1 | 10/2013 | Moganti | |
| 2013/0279685 A1 | 10/2013 | Kohler | |
| 2013/0317871 A1 | 11/2013 | Kulkarni | |
| 2013/0321467 A1 | 12/2013 | Tappen | |
| 2013/0339099 A1 | 12/2013 | Aidroos | |
| 2013/0339831 A1 | 12/2013 | Gulanikar | |
| 2014/0007005 A1 | 1/2014 | Libin | |
| 2014/0012603 A1 | 1/2014 | Scanlon | |
| 2014/0025767 A1 | 1/2014 | De Kezel | |
| 2014/0036639 A1 | 2/2014 | Taber | |
| 2014/0040780 A1 | 2/2014 | Brian | |
| 2014/0040905 A1 | 2/2014 | Tadanobu | |
| 2014/0058801 A1 | 2/2014 | Deodhar | |
| 2014/0059910 A1 | 3/2014 | Norton | |
| 2014/0068746 A1 | 3/2014 | Gonzalez Martinez | |
| 2014/0074536 A1 | 3/2014 | Meushar | |
| 2014/0089719 A1 | 3/2014 | Daum | |
| 2014/0101310 A1* | 4/2014 | Savage | H04W 4/60 709/224 |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0350997 A1* | 11/2014 | Holm | G06Q 10/06316 705/7.26 |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0178666 A1 | 6/2015 | Green | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0312375 A1 | 10/2015 | Valey | |
| 2015/0317595 A1 | 11/2015 | De | |
| 2015/0339006 A1 | 11/2015 | Chaland | |
| 2015/0348496 A1 | 12/2015 | Santos, II | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1* | 3/2016 | Kass | H04L 12/1859 709/206 |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1* | 5/2016 | Figlin | G06Q 10/063114 705/7.15 |
| 2016/0147773 A1 | 5/2016 | Smith | |
| 2016/0147846 A1 | 5/2016 | Smith | |
| 2016/0148157 A1* | 5/2016 | Walia | G06Q 10/107 705/300 |
| 2016/0180277 A1 | 6/2016 | Skiba | |
| 2016/0180298 A1 | 6/2016 | Mcclement | |
| 2016/0182311 A1 | 6/2016 | Borna | |
| 2016/0188145 A1 | 6/2016 | Gabor | |
| 2016/0216854 A1 | 7/2016 | Mcclellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0285838 A1 | 9/2016 | Ford | |
| 2016/0313934 A1 | 10/2016 | Isherwood | |
| 2016/0328217 A1 | 11/2016 | Hagerty | |
| 2016/0342927 A1 | 11/2016 | Reznik | |
| 2016/0366569 A1 | 12/2016 | Wu | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0039503 A1 | 2/2017 | Jones | |
| 2017/0046807 A1 | 2/2017 | Ford | |
| 2017/0061341 A1 | 3/2017 | Haas | |
| 2017/0068403 A1 | 3/2017 | Ohsumi | |
| 2017/0068933 A1 | 3/2017 | Norton | |
| 2017/0093874 A1* | 3/2017 | Uthe | G06F 3/0482 |
| 2017/0099148 A1 | 4/2017 | Ochmanski | |
| 2017/0099296 A1* | 4/2017 | Fisher | H04L 63/104 |
| 2017/0103369 A1 | 4/2017 | Thompson | |
| 2017/0116552 A1 | 4/2017 | Deodhar | |
| 2017/0132200 A1 | 5/2017 | Noland | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0192642 A1 | 7/2017 | Fishman | |
| 2017/0206217 A1 | 7/2017 | Deshpande | |
| 2017/0249577 A1 | 8/2017 | Nishikawa | |
| 2017/0255455 A1 | 9/2017 | Collier | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1* | 11/2017 | Baek | G06Q 10/107 |
| 2017/0323350 A1 | 11/2017 | Laderer | |
| 2017/0344754 A1 | 11/2017 | Kumar | |
| 2017/0346861 A1 | 11/2017 | Pearl | |
| 2017/0351385 A1 | 12/2017 | Ertmann | |
| 2018/0032524 A1 | 2/2018 | Byron | |
| 2018/0052943 A1 | 2/2018 | Hui | |
| 2018/0053127 A1 | 2/2018 | Boileau | |
| 2018/0059910 A1 | 3/2018 | Wooten | |
| 2018/0060785 A1* | 3/2018 | Carnevale | G06Q 10/06313 |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0131649 A1 | 5/2018 | Ma | |
| 2018/0152407 A1 | 5/2018 | Soni | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189736 A1 | 7/2018 | Guo | |
| 2018/0225795 A1 | 8/2018 | Napoli | |
| 2018/0247352 A1 | 8/2018 | Rogers | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0367506 A1 | 12/2018 | Ford | |
| 2018/0373804 A1 | 12/2018 | Zhang | |
| 2019/0005048 A1 | 1/2019 | Crivello | |

(56) References Cited

U.S. PATENT DOCUMENTS

| | | |
|---|---|---|
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0057356 A1 | 2/2019 | Larsen |
| 2019/0068390 A1* | 2/2019 | Gross .................. H04L 12/1827 |
| 2019/0079909 A1* | 3/2019 | Purandare ............ G06Q 10/101 |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0121863 A1 | 4/2019 | Embiricos |
| 2019/0121994 A1 | 4/2019 | Embiricos |
| 2019/0123924 A1 | 4/2019 | Embiricos |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1* | 5/2019 | Balakrishna ......... G06Q 30/016 705/7.14 |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1* | 11/2019 | Cunico .................. G06F 16/38 |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0293975 A1 | 9/2020 | Faulkner |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0014214 A1 | 1/2021 | Ford |
| 2021/0097466 A1 | 4/2021 | Sabo |
| 2021/0103451 A1 | 4/2021 | Sabo |
| 2021/0105280 A1 | 4/2021 | Lansing |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0225321 A1 | 7/2021 | Kogan |
| 2021/0232282 A1 | 7/2021 | Karpe |
| 2021/0248161 A1 | 8/2021 | Leston |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2023/0208666 A1 | 6/2023 | Raghavan |
| 2023/0251880 A1 | 8/2023 | Justin |
| 2024/0086045 A1 | 3/2024 | Lin |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fang Chen, et al. "Project Progress Tracking Template—Using a Repeatable GSS Process to Facilitate Project Process Management," Proceedings of the 39th Annual Hawaii International Conference on System Sciences (HICSS'06), Kauai, HI, 2006, pp. 17c-17c, doi: 10.1109/HICSS.2006.399 (Year: 2006).

Fruhlinger, Joshua. "The Best To-Do ListApps for Feeling Productive; With the right app, feeling productive can be just as gratifying

(56) References Cited

OTHER PUBLICATIONS as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
Justin Rosenstein, Focus Mode is a new feature that could raise your IQ, Asana Blog; published Apr. 19, 2013; [retrieved from the internet on Jan. 22, 2021] https://blog.asana.com/2013/04/focus-mode-is-a-new-feature-that-could-raise-your-iq/ (13 pages).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
www.cogmotive.com/blog/author/alan Alan Byrne: "Creating a company Shared Calendar in Office 365"; pp. 1-17; Sep. 10, 2013 (16 pages).
C. Wang, G. Bo and Y. Zhang, Design and Implementation of Authentication and Authorization Flow in ESCP System, 2013 Fourth International Conference on Emerging Intelligent Data and Web Technologies, Xi'an, China, 2013, pp. 564-568, doi: 10.1109/EIDWT.2013.101. (Year: 2013).
San Murugesan; Irena Bojanova, "OAuth Standard for User Authorization of Cloud Services," in Encyclopedia of Cloud Computing IEEE, 2016, pp. 406-416, doi: 10.1002/9781118821930.ch34. (Year: 2016).
Y. Wu, L. He, Y. Shan, P. Zhang, M. He and Z. Yang, "TrustyShare: a Sharing Scheme using ARM TrustZone," 2020 IEEE 19th International Conference on Trust, Security and Privacy in Computing and Communications (TrustCom), Guangzhou, China, 2020, pp. 1741-1747, doi: 10.1109/TrustCom50675.2020.00239. (Year: 2020).

\* cited by examiner

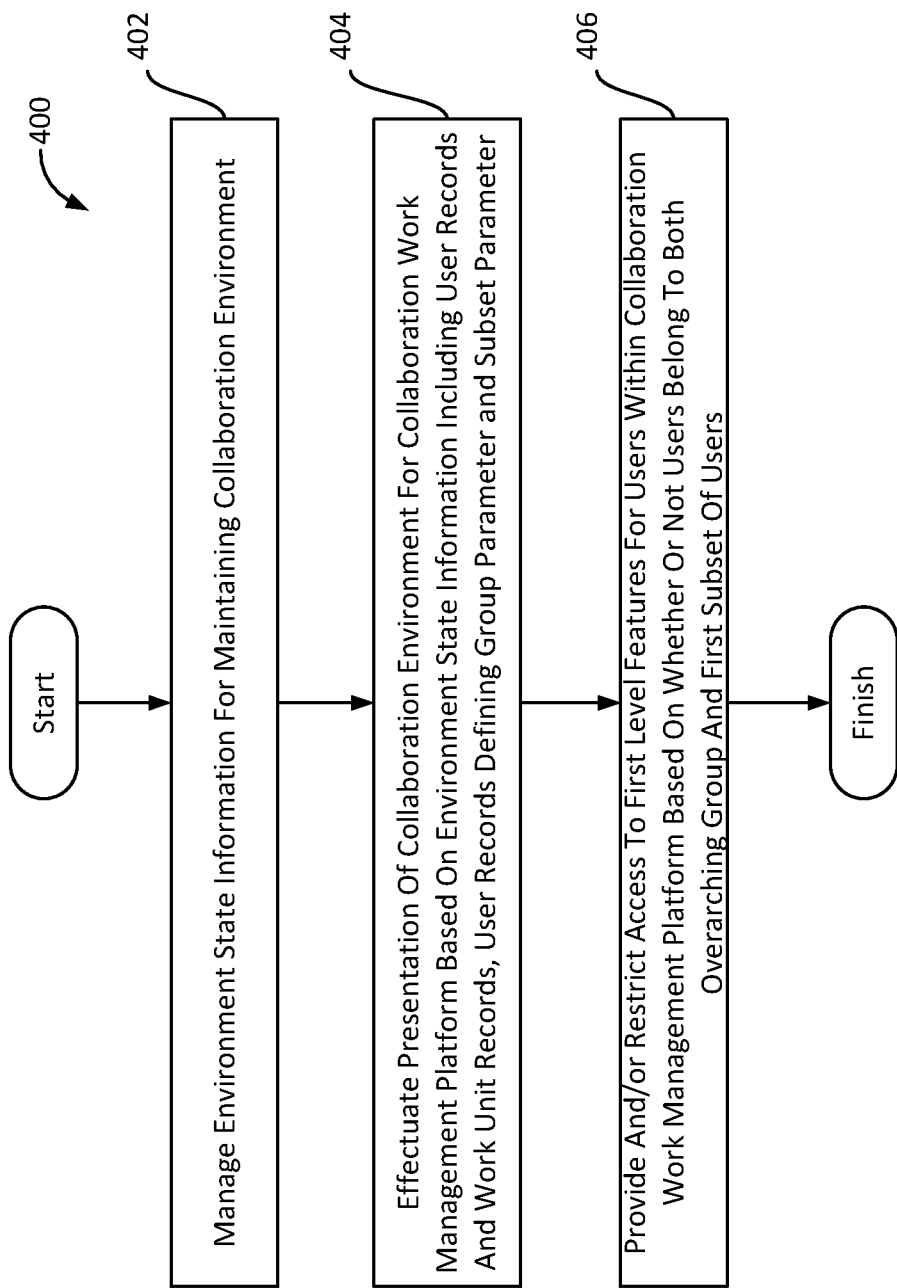

SYSTEMS AND METHODS FOR PROVIDING A COLLABORATION WORK MANAGEMENT PLATFORM THAT FACILITATES DIFFERENTIATION BETWEEN USERS IN AN OVERARCHING GROUP AND ONE OR MORE SUBSETS OF INDIVIDUAL USERS

FIELD OF THE DISCLOSURE

The present disclosure relates to systems and methods for providing a collaboration work management platform that facilitates differentiation between users in an overarching group and one or more subsets of individual users within the overarching group to enable the users within the individual subsets to use the collaboration work management platform differently from users within the other subsets.

BACKGROUND

Typical work management platforms have paid subscriptions and free subscriptions. In existing collaborative platforms, if some users want premium features that come with the paid subscription, all users within the same organization have to pay to upgrade their subscription because the data structure does not enable sub-groups within companies to have different types of accounts (e.g., some paid, some not) that provide different features. Providing premium features on an "organization" level only is not workable for a bottom up enterprise sales approach, because it requires a commitment to buy all register users across a large organization. However, buying a single "team" offers too limited functionality to satisfy the needs of divisional or departmental level buyers. These buyers, as a reflection of their purview, need to buy a collection of teams. Without a robust data structure accounting for groups and subgroups, this isn't possible.

SUMMARY

One feature of the present disclosure includes systems and methods for providing a collaboration work management platform that facilitates differentiation between users in an overarching group and one or more subsets of individual users within the overarching group to enable the users within the individual subsets to use the collaboration work management platform differently users within the other subsets. Functionality may be effectuated by establishing a data structure that differentiates between users in an overarching group and one or more subsets of individual users within the overarching group. In previously existing work management systems and methods there was a limited set of capabilities for organizations that have different subsets of users. Typically, in existing systems, access to features, account types, layout, options, permissions, content, functionality, and/or other differentiating aspects of work management systems but be differentiated on an entire organization level, or on a user-by-user basis. A data structure that differentiates between users in an overarching group and one or more subsets of individual users within the overarching group may facilitate differentiation between subsets of users. By way of non-limiting example, individual subsets of users may have different types of accounts among users within an organization (e.g., some premium accounts and some non-premium accounts), different layouts or options, different permissions, different customizations, different content, different functionality, and/or other different features or different ways in which the users in individual subsets may use the management platform. The solution described herein creates another layer within the data structure, a "middle layer" option (e.g., subsets), for these situations. A data structure having "group" and "subset" divisions may allow a wider deployment different functionality.

One aspect of the present disclosure relates to a system configured for providing a collaboration work management platform that facilitates differentiation between users in an overarching group and one or more subsets of individual users within the overarching group to enable the users within the individual subsets to use the collaboration work management platform differently users within the other subsets. The system may include one or more hardware processors configured by machine-readable instructions. The system may include one or more servers, one or more client computing platforms, and/or other components. The one or more servers may be configured to communicate with one or more client computing platforms according to a client/server architecture and/or other architecture. The one or more hardware processors may be configured by machine-readable instructions to execute one or more computer program components. The computer program components may include one or more of an environment state component, a presentation component, a features component, and/or other components.

The environment state component may be configured to manage environment state information for maintaining a collaboration environment. The environment state information may include user records and work unit records. The environment state information may define a state of the collaboration environment including a user state and a work unit state. The user state may be defined by the user records that define values of user parameters associated with users interacting with and/or viewing the collaboration environment. The work unit state may be defined by the work unit records that define values of work unit parameters for units of work managed, created, and/or assigned within the collaboration environment.

The user parameters may include a group parameter identifying the overarching group to which a first set of users, including a first user, belong such that a first user record for the first user defines a first group value of the group parameter indicating the overarching group. An overarching group may be a high-level group within an entity that may represent the entity and/or a division of the entity as a whole. An overarching group may include one of more of an organization, a company, an entity, a corporation, an enterprise, a business, and/or another overarching group.

The user parameters may include a subset parameter denoting one or more subsets within an overarching group to which one or more users within the first set of users belongs such that the first user record for the first user defines a first subset value of the subset parameter indicating a first subset within the overarching group to which a first subset of users including the first user belong. The subset may include one or more teams, sub-groups, divisions, departments, task forces, and/or other subsets. In some implementations individual subsets may include multiple groups of users (e.g., smaller than the overarching group). By way of non-limiting example, the multiple groups of users within a subset may include multiple teams.

The processor(s) may be configured to effectuate presentation of the collaboration environment for the collaboration work management platform based on the environment state information including the user records and the work unit records.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates a method for providing a collaboration work management platform that facilitates differentiation between users in an overarching group and one or more subsets of individual users within the overarching group to enable the users within the individual subsets to use the collaboration work management platform differently users within the other subsets, in accordance with one or more implementations.

DETAILED DESCRIPTION

Figure 1:
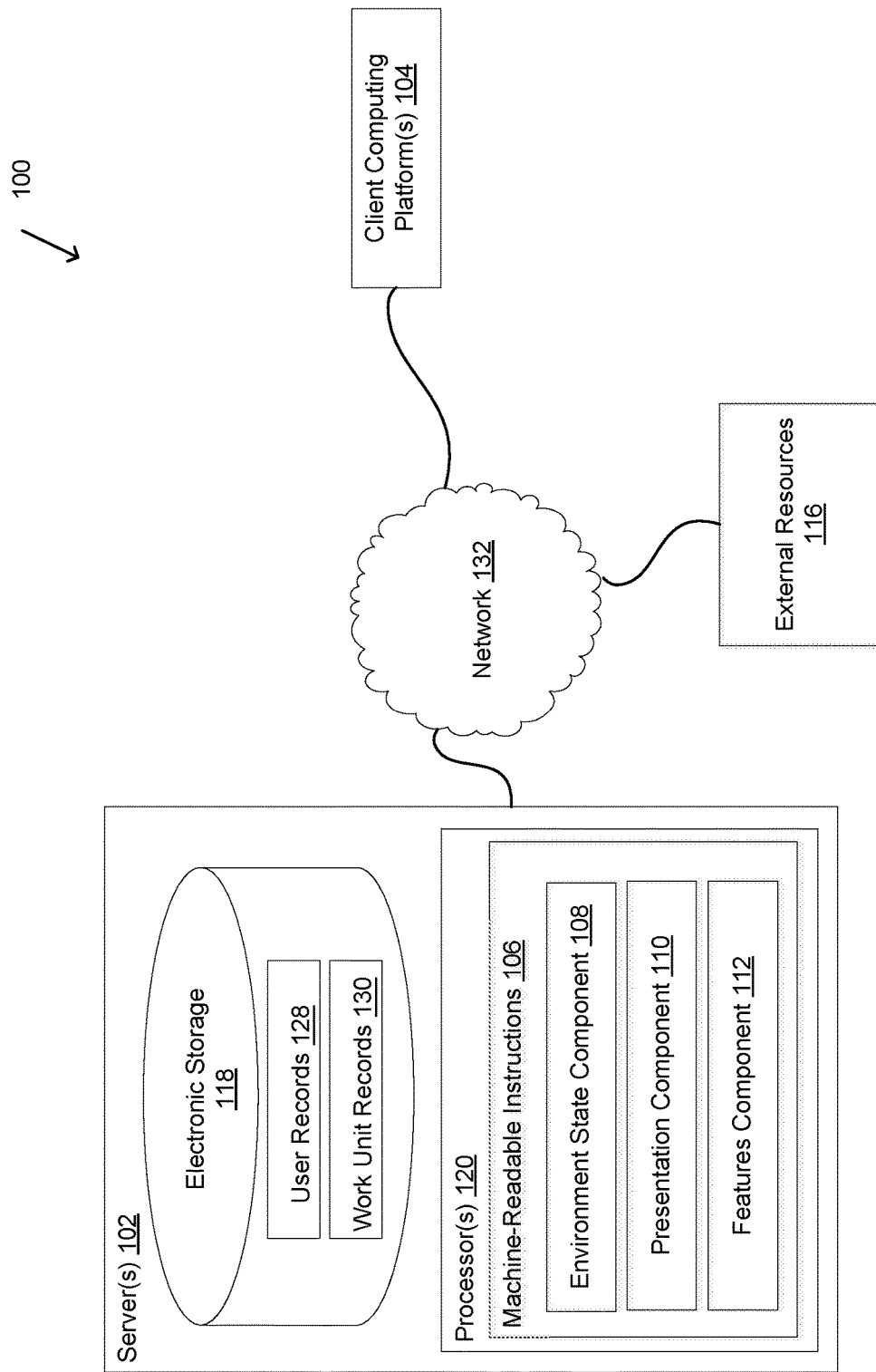
FIG. 1 illustrates a system configured for providing a collaboration work management platform that facilitates differentiation between users in an overarching group and one or more subsets of individual users within the overarching group to enable the users within the individual subsets to use the collaboration work management platform differently from users within the other subsets, in accordance with one or more implementations.

FIG. 1 illustrates a system 100 configured for providing a collaboration work management platform that facilitates differentiation between users in an overarching group and one or more subsets of individual users within the overarching group to enable the users within the individual subsets to use the collaboration work management platform differently users within the other subsets, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, a presentation component 110, a features component 112, and/or other instruction components.

Environment state component 108 may be configured to manage environment state information to maintain a collaboration environment. The environment state information may include user records and work unit records. The environment state information may define a state of the collaboration environment including user states, work unit states, and/or other states. The user states may be defined by the user records that define values of user parameters associated with users interacting with and/or viewing the collaboration environment. Individual ones of the user records may correspond to individual ones of the users. The work unit states may be defined by the work unit records that define values of work unit parameters for units of work managed, created, and/or assigned within the collaboration environment. Individual ones of the work unit records may correspond to individual ones of the units of work and/or be associated with one or more users and/or other units of work.

The environment state information may include user records, work unit records, and/or other records. The environment state information may be continuously generated and/or updated based on the state of the collaboration environment representing the users' interactions with the collaboration environment. The state of the collaboration environment may include a user state, a work unit state, and/or other states. The user state may be defined by the user records. The user records may define values of user parameters associated with users interacting with and/or viewing the collaboration environment. The work unit state may be defined by the work unit records. The work unit records may define values of work unit parameters for units of work managed, created, and/or assigned within the collaboration environment. In some implementations, the work unit state may include a project state, a task state, a sub-task state, and/or other states. The work unit records may include project records, task records, sub-task records, and/or other records.

The work unit parameters for work units managed, created, and/or assigned within the collaboration environment may include parameters describing one or more work units managed, created, and/or assigned within the collaboration environment and/or via the collaboration work management platform, and/or the metadata associated with the one or more work units. Individual ones of the work units may be associated with individual ones of the work unit records. A work unit record may define values of the work unit parameters associated with a given work unit managed, created, and/or assigned within the collaboration environment and/or via the collaboration work management platform. A given work unit may have one or more owners and/or one or more team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given work unit may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a work unit name, a work unit description, one or more work unit dates (e.g., a start date, a due date, a completion date, and/or other work unit dates), one or more members associated with a unit of work (e.g., an owner, one or more other project/task members, member access information, and/or other work unit members and/or member information), a status and/or progress (e.g., an update, a hardcoded status update, a measured status, quantity of work units remaining in a given project, completed work units in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other work unit order, etc.), one or more authorized applications, one or more presence/interaction parameters (e.g., indicating presence and/or interaction level at an environment level, work unit level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, other user parameters for the given user, and/or other user parameters and/or work unit parameters, for one or more work units the given user is associated with.

The user parameters may include a group parameter identifying the overarching group. A first set of users, including a first user, may belong to the overarching group. As such, a first user record for the first user may define a first group value of the group parameter indicating the overarching group. An overarching group may be a high-level group within an entity that may represent the entity and/or a division of the entity as a whole (e.g., at the "org" or "organization level"). An overarching group may include one of more of an organization, a company, an entity, a corporation, an enterprise, a business, and/or another overarching group. An overarching group may comprise an organized group of users and/or other entities with a particular purpose (e.g., business, work, education, that engage in business and/or work together toward a common goal.

The user parameters may include a subset parameter denoting one or more subsets within an overarching group. One or more one or more users within the first set of users may belong to one or more subsets. The first user record for the first user may define a first subset value of the subset parameter indicating a first subset within the overarching group to which a first subset of users, including the first user, belong. A subset may include a sub-group of users and/or groups of users within the overarching group. A subset may be any group or groups of users smaller than the overarching group and/or within the overarching group. The subsets may be system specific and/or correspond to sub-groups existing within a company (e.g., teams, departments, divisions, etc.). The subsets may include one or more of a team, a sub-group, a division, a department, a task force, and/or other subset. In some implementations individual subsets may include multiple groups of users (e.g., smaller than the overarching group). By way of non-limiting example, the multiple groups of users within a subset may include multiple teams. By way of non-limiting example, a given user may belong to one or more of the multiple teams such that a given user belonging to a given subset may belong to multiple teams within the given subset. A subset division in the data structure may enable users belonging to multiple teams within a given subset to have premium features (e.g., first level features) for the multiple ones of the teams included in the subset.

The user parameters may include a user account parameter. The users may have user accounts. Individual ones of the user accounts may have different account levels. The account levels may indicate whether or not a user has a subscription level account (e.g., a premium level account, an executive account, a corporate account, etc.), a basic account, a free account, guest accounts, and/or other account levels. Different subsets of users may have different levels of accounts. For example, the users belonging to the first subset may have first level accounts. First level accounts may include subscription level accounts. By way of example, the users belonging to the overarching group but not within the first subset may have second level accounts and/or other level accounts (besides first level accounts). Second level accounts may be basic, free, and/or guest accounts. The level of a given user's account may dictate which features the given user has access to within the collaboration environment.

It is noted that any metadata and/or values of parameters related to any users, units of work, projects, tasks, subtasks, and/or other units of work may be considered values of user parameters and/or work unit parameters. The terms "user parameters" and/or "work unit parameters" may be used interchangeably herein.

Figure 2:
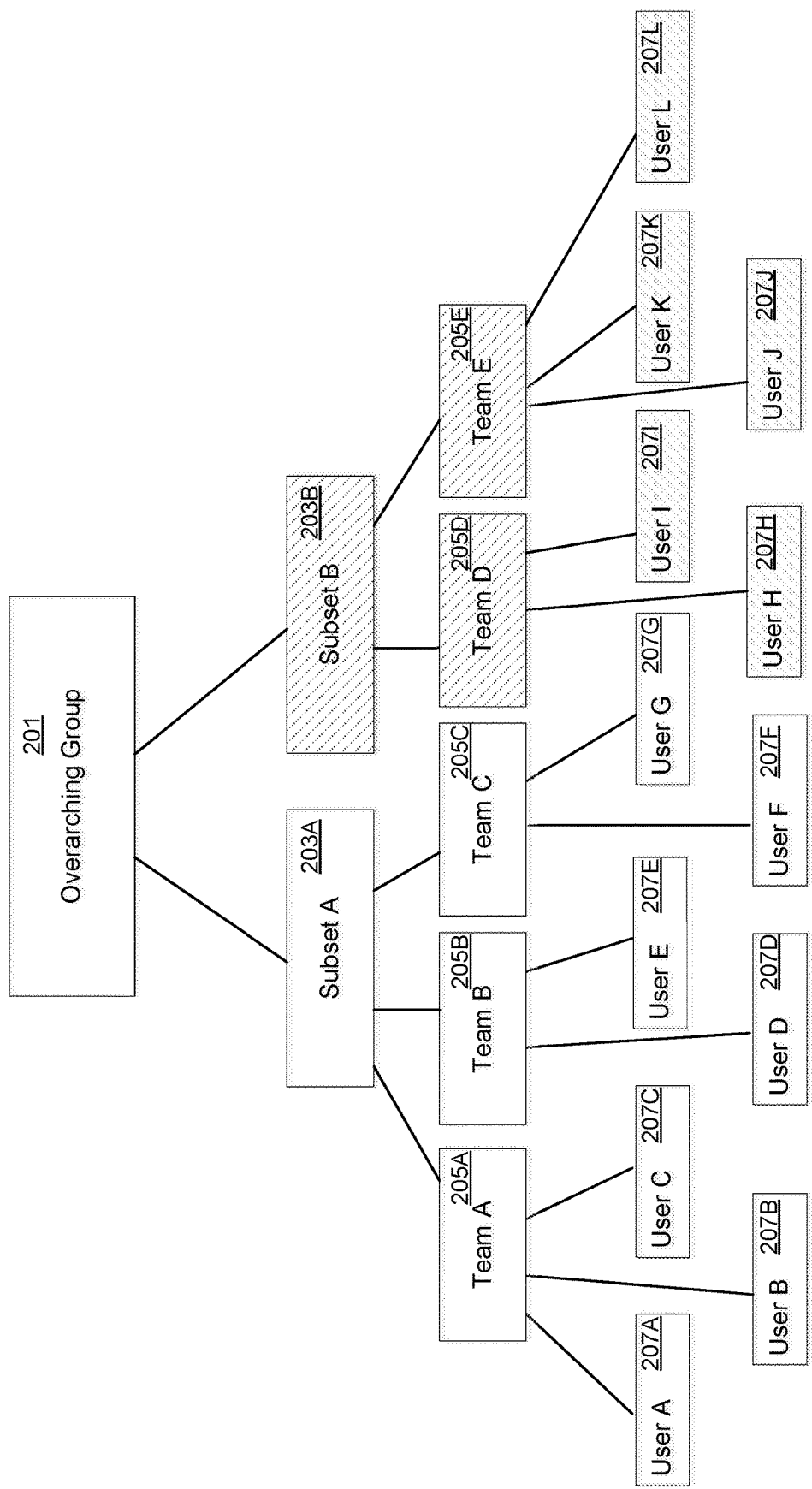
FIG. 2 illustrates an example overarching group and subset configuration as indicated by a group parameter and a subset parameter, in accordance with one or more implementations.

FIG. 2 illustrates an example overarching group and subset configuration as indicated by a group parameter and a subset parameter, in accordance with one or more implementations. Overarching group 201 may include one or more subsets 203. Subsets 203 may include one or more teams 205. Teams 205 may include one or more users 207. Users 207 within a given team 205 and within a given subset 203 may belong to both the given subset 203 and overarching group 201. For example, a user record for user A 207A may define a first team value for the team parameter indicting team A 205A. The user record for user A 207A may define a first group value of the group parameter indicating overarching group 201, and/or a first subset value of the subset parameter indicating subset A 203A. Subset B 203B may be premium level subset including Team D 205D and Team E 205E. User accounts for User H 207H, User I 207I, User J 207J, User K 207K, and User L 207L may be first level accounts. Subset A 203A may be a second level subset such that user accounts for User E 204E, User F 204F, and User G 204G may be second level accounts (and/or other level accounts besides first level accounts). User A 207A, User B 207B, User C 207C, User D 207D, User E 207E, User F 207F, and User G 207G may have second level accounts. User H 207H, User I 207I, User J 207J, User K 207K, and User L 207L may have access to one or more first level features. User A 207A, User B 207B, User C 207C, User D 207D, User E 207E, User F 207F, and User G 207G may be restricted from accessing the first level features.

In some implementations, User A 207A, User B 207B, User C 207C, User D 207D, User E 207E, User F 207F, and/or User G 207G may have access to one or more first level features while they collaborate and/or interact with one or more of User H 207H, User I 207I, User J 207J, User K 207K, and User L 207L. By way of non-limiting example, if User K 207K assigns a unit of work to User G 207G, User G 207G may have access to one or more first level features while working on the unit of work.

Returning to FIG. 1, presentation component 110 may be configured to effectuate presentation of the collaboration environment for the collaboration work management platform based on the environment state information including the user records and the work unit records. Presentation of the collaboration environment may be based on environment state information. The collaboration environment may be presented via individual client computing platform(s) 104 through which the users access the collaboration environment. The collaboration environment may include a one or more graphical user interfaces for presenting work information (e.g., for units of work associated with users) to the users, assigning units of work, managing units of work, organizing units of work, facilitating communication between the users, facilitating collaboration between the users, and/or otherwise facilitating a collaboration work management platform.

Features component 112 may be configured to provide access to and/or restrict access to first level features for the users within the collaboration work management platform. Access may be provided and/or restricted based on whether or not the users belong to both the overarching group and the first subset of users. Features component 112 may be configured to determine whether or not the users belong to both the overarching group and the first subset of users, and/or which subset(s) the user's belong to. In some implementations, responsive to a user belonging to a first subset and the first overarching affiliation, they may be approved and/or able to register for a first level account.

In some implementations, access to a first level feature may be provided to the first subset of users based on the first subset of users belonging to both the overarching group and the first subset. In some implementations, access to a first level feature may be restricted for a second subset of users based on the second subset of users belonging to the overarching group but not to the first subset. In some implementations, access to first level features within the collaboration work management platform may be provided to the first subset of users. First level features may include one or more of a type of account, a layout, one or more options, one or more permissions, a given functionality, one or more customizations, a type and/or specific content, and/or other different features or different ways in which the users in individual subsets may use the management platform.

By way of non-limiting example, users belonging to the first subset and the overarching group may have access to a premium account, a given platform layouts, a given access point (e.g., mobile access), a given option (e.g., to interact with external users, to view a timeline and/or dashboard, to view statistics related to the platform, etc.), different permissions (e.g., to add and/or remove new users, to create and/or delete projects, etc.), different customizations (e.g., a given homepage view, a color scheme, one or more application plug ins, etc.), different content (e.g., content relevant to that subset), different functionality (e.g., given management type functions, etc.) and/or other different features or different ways in which the users in individual subsets may use the management platform.

In some implementations, first level features may include one or more premium features. By way of non-limiting example, the first level features may include one or more of custom work unit templates (e.g., custom templates for creating units of work), external invite capabilities (e.g., enabling communication and/or collaboration with users outside the platform), dashboard reports across subsets (e.g., status reports of units of work associated with users within subsets), advanced search features, limiting access to units of work, advanced support resources, dependency capabilities (e.g., facilitating work unit dependencies such that a given unit of work may be dependent on another unit of work such that the other unit of work needs to be completed before the given unit of work can be started), onboarding resources (e.g., training materials, training sessions, etc.), premium authentication methods (e.g., SAML single sign on), unit of work comments (e.g., project comments), premium views (e.g., a timeline view, a prioritization view, etc.) and/or other features.

In some implementations, premium features may include one or more customizable features. Customizable features may include one or more features available to all users but customizable for users having first level accounts. Customizable features may not be feasible for all users across an organization because one subset's customization may not be relevant and/or applicable for another subset. Having both group level and subset level distinctions (within the user records) enables customizations for individual ones of the subsets, without applying such customizations to the entire group (e.g., organization, etc.). For example, the customizable features may include one or more of customizable status updates for units of work, customizable communication options, customizable work information fields, customizable dashboard views, customizable settings, privacy settings for subsets (e.g., subsets marked private), and/or other customizable features.

In some implementations, users having first level accounts may interact and/or collaborate with users having second level accounts. In such instances, features component 112 may be configured to enable users having second level accounts to use one or more of the first level features while interacting and/or collaborating with the users that have first level accounts. For example, features component 112 may enable use of the first level feature by individual ones of the users in the second subset of users belonging to the overarching group but not belonging to the first subset while individuals ones of the users within the first subset of users are engaging with the individual ones of the users in the second subset of users. Use of the first level features may be limited and/or restricted to use for a specific unit of work, interaction, and/or collaboration between a user having a first level account and a user having a second level account.

In some implementations, feature component 112 may be configured to provide access to second level features within the collaboration work management platform to the users belonging to the overarching group. The users belonging to the overarching group, including the users that have first level accounts, second level accounts, and/or other level accounts (but belong to the overarching group). Second level features may include standard platform features including but not limited to: work unit generation, assignment of units of work, communication, attachments for units of work, status updates, activity feed, various views of one or more units of work associated with the user, work unit permissions, work unit workspaces, and/or other features.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert and/or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some and/or all of the functionality attributed herein to external resources 116 may be provided by resources included in system 100.

Server(s) 102 may include electronic storage 118, one or more processors 120, and/or other components. Server(s) 102 may include communication lines, and/or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one and/or both of system storage that is provided integrally (i.e., substantially non-removable) with server(s) 102 and/or removable storage that is removably connectable to server(s) 102 via, for example, a port (e.g., a USB port, a firewire port, etc.) and/or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, and/or processor(s) 120 may represent processing functionality of a plurality of devices operating in coordination. Processor(s) 120 may be configured to execute components 108, 110, 112, and/or other components. Processor(s) 120 may be configured to execute components 108, 110, 112, and/or other components by software; hardware; firmware; some combination of software, hardware, and/or firmware; and/or other mechanisms for configuring processing capabilities on processor(s) 120. As used herein, the term "component" may refer to any component and/or set of components that perform the functionality attributed to the component. This may include one or more physical processors during execution of processor readable instructions, the processor readable instructions, circuitry, hardware, storage media, and/or any other components.

It should be appreciated that although components 108, 110, and 112 are illustrated in FIG. 1 as being implemented within a single processing unit, in implementations in which processor(s) 120 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more and/or less functionality than is described. For example, one or more of components 108, 110, and/or 112 may be eliminated, and some and/or all of its functionality may be provided by other ones of components 108, 110, and/or 112.

As another example, processor(s) 120 may be configured to execute one or more additional components that may perform some and/or all of the functionality attributed below to one of components 108, 110, and/or 112.

Figure 3:
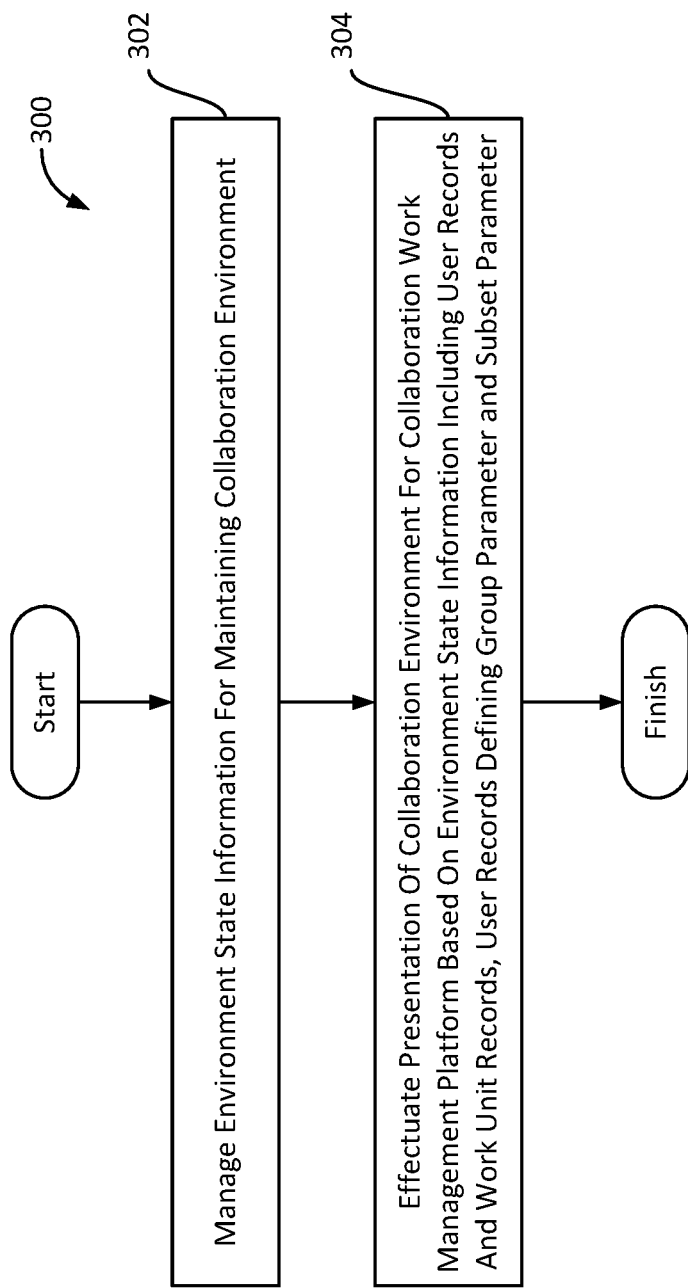
FIG. 3 illustrates a method for providing a collaboration work management platform that facilitates differentiation between users in an overarching group and one or more subsets of individual users within the overarching group to enable the users within the individual subsets to use the collaboration work management platform differently users within the other subsets, in accordance with one or more implementations.

FIG. 3 illustrates a method 300 for providing a collaboration work management platform that facilitates differentiation between users in an overarching group and one or more subsets of individual users within the overarching group to enable the users within the individual subsets to use the collaboration work management platform differently users within the other subsets, the method being implemented by a computer system including one or more physical processors configured by machine-readable instructions, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some and/or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include managing environment state information for maintaining a collaboration environment. The environment state information may include user records and work unit records. The environment state information may define a state of the collaboration environment including a user state and a work unit state. The user state may be defined by the user records that define values of user parameters associated with users interacting with and/or viewing the collaboration environment. The work unit state may be defined by the work unit records that define values of work unit parameters for units of work managed, created, and/or assigned within the collaboration environment. The user parameters may include a group parameter identifying the overarching group to which a first set of users, including a first user, belong. As such, a first user record for the first user may define a first group value of the group parameter indicating the overarching group. The user parameters may include a subset parameter denoting one or more subsets within an overarching group to which one or more users within the first set of users belongs. As such, the first user record for the first user may define a first subset value of the subset parameter indicating a first subset within the overarching group to which a first subset of users, including the first user, belong. Operation 302 may be performed by one or more hardware processors configured by machine-readable instructions including a component that is the same as and/or similar to collaboration environment component 108, in accordance with one or more implementations.

An operation 304 may include effectuating presentation of the collaboration environment for the collaboration work management platform based on the environment state information including the user records and the work unit records. Operation 304 may be performed by one or more hardware processors configured by machine-readable instructions including a component that is the same as and/or similar to presentation component 110, in accordance with one or more implementations.

FIG. 4 illustrates a method 400 for providing a collaboration work management platform that facilitates differentiation between users in an overarching group and one or more subsets of individual users within the overarching group to enable the users within the individual subsets to use the collaboration work management platform differently users within the other subsets, the method being implemented by a computer system including one or more physical processors configured by machine-readable instructions, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some and/or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include managing environment state information for maintaining a collaboration environment. The environment state information may include user records and work unit records. The environment state information may define a state of the collaboration environment including a user state and a work unit state. The user state may be defined by the user records that define values of user parameters associated with users interacting with and/or viewing the collaboration environment. The work unit state may be defined by the work unit records that define values of work unit parameters for units of work managed, created, and/or assigned within the collaboration environment. The user parameters may include a group parameter identifying the overarching group to which a first set of users, including a first user, belong. As such, a first user record for the first user may define a first group value of the group parameter indicating the overarching group. The user parameters may include a subset parameter denoting one or more subsets within an overarching group to which one or more users within the first set of users belongs. As such, the first user record for the first user may define a first subset value of the subset parameter indicating a first subset within the overarching group to which a first subset of users, including the first user, belong. Operation 402 may be performed by one or more hardware processors configured by machine-readable instructions including a component that is the same as and/or similar to collaboration environment component 108, in accordance with one or more implementations.

An operation 404 may include effectuating presentation of the collaboration environment for the collaboration work management platform based on the environment state information including the user records and the work unit records. Operation 404 may be performed by one or more hardware processors configured by machine-readable instructions including a component that is the same as and/or similar to presentation component 110, in accordance with one or more implementations.

An operation 406 may include providing and/or restricting access to first level features for the users within the collaboration work management platform based on whether or not the users belong to both the overarching group and the first subset of users. Operation 406 may be performed by one or more hardware processors configured by machine-readable instructions including a component that is the same as and/or similar to presentation component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to temporarily enable features within an online collaboration environment, the system comprising:
    one or more hardware processors configured by machine-readable instructions to:
        enable use of a first feature by a first user while the first user is collaborating with a second user within an online collaboration environment, the first user belonging to a first subset of users but not belonging to a second subset of users, the second user belonging to the second subset of users; and
        disable the use of the first feature by the first user when the first user is no longer collaborating with the second user within the online collaboration environment.

2. The system of claim 1, wherein the one or more hardware processors are further configured by the machine-readable instructions to:
    manage user information associated with the first user and the second user, the user information identifying an overarching group of the first user and the second user.

3. The system of claim 1, wherein the first subset of users has an account level that is different from the second subset of users.

4. The system of claim 3, wherein the account level of the first subset of users does not provide access to the first feature.

5. The system of claim 4, wherein another account level of the second subset of users is associated with access to the first feature.

6. The system of claim 1, wherein the first feature is one or more of use of custom work unit template, an external invite capability, use of a dashboard report, a search feature, access to work units, access to a support resource, a dependency capability, or access to onboarding resources.

7. The system of claim 2, wherein the overarching group includes one or more of an organization, a company, an entity, a corporation, an enterprise, or a business.

8. The system of claim 7, wherein the first subset of users includes one or more of a sub-group, a division, a department, or a task force within the overarching group.

9. The system of claim 1, wherein the one or more hardware processors are further configured by the machine-readable instructions to determine when the first user is collaborating with the second user by determining if the first user and the second user are working on a specific unit of work within the online collaboration environment.

10. The system of claim 1, wherein the one or more hardware processors are further configured by the machine-readable instructions to determine when the first user is collaborating with the second user by determining if the first user and/or the second user are performing a specific interaction within the online collaboration environment.

11. A method to temporarily enable features within an online collaboration environment, the method comprising:
    enabling use of a first feature by a first user while the first user is collaborating with a second user within an online collaboration environment, the first user belonging to a first subset of users but not belonging to a second subset of users, the second user belonging to the second subset of users; and
    disabling the use of the first feature by the first user when the first user is no longer collaborating with the second user within the online collaboration environment.

12. The method of claim 11, further comprising:
    obtaining user information associated with the first user and the second user, the user information identifying an overarching group of the first user and the second user.

13. The method of claim 11, wherein the first subset of users has an account level that is different from the second subset of users.

14. The method of claim 13, wherein the account level of the first subset of users does not provide access to the first feature.

15. The method of claim 14, wherein another account level of the second subset of users is associated with access to the first feature.

16. The method of claim 11, wherein the first feature is one or more of use of custom work unit template, an external invite capability, use of a dashboard report, a search feature, access to work units, access to a support resource, a dependency capability, or access to onboarding resources.

17. The method of claim 12, wherein the overarching group includes one or more of an organization, a company, an entity, a corporation, an enterprise, or a business.

18. The method of claim 17, wherein the first subset of users includes one or more of a sub-group, a division, a department, or a task force within the overarching group.

19. The method of claim 11, further comprising determining when the first user is collaborating with the second user by determining if the first user and the second user are working on a specific unit of work within the online collaboration environment.

20. The method of claim 11, further comprising determining when the first user is collaborating with the second user by determining if the first user and/or the second user are performing a specific interaction within the online collaboration environment.

* * * * *